United States Patent
Basista et al.

(10) Patent No.: US 9,308,816 B1
(45) Date of Patent: Apr. 12, 2016

(54) FUEL TANK COUPLING ASSEMBLY

(71) Applicant: GM GLOBAL TECHNOLOGY OPERATIONS LLC, Detroit, MI (US)

(72) Inventors: Jeffrey S. Basista, Milford, MI (US); Philip A. Yaccarino, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2 days.

(21) Appl. No.: 14/512,665

(22) Filed: Oct. 13, 2014

(51) Int. Cl.
  *B60K 15/07* (2006.01)
  *B60K 15/073* (2006.01)
  *B60K 15/03* (2006.01)
  *B62D 25/20* (2006.01)

(52) U.S. Cl.
  CPC .......... *B60K 15/073* (2013.01); *B60K 15/03006* (2013.01); *B62D 25/20* (2013.01); *B60K 2015/03453* (2013.01)

(58) Field of Classification Search
  CPC .............................. B60K 15/067; B60K 15/07
  See application file for complete search history.

(56) References Cited

U.S. PATENT DOCUMENTS

| | | | | | |
|---|---|---|---|---|---|
| 4,223,899 | A * | 9/1980 | Krieger | ................. | B60K 15/00 180/900 |
| 4,469,340 | A * | 9/1984 | Condet | ................ | B60K 15/067 248/311.2 |
| 4,895,268 | A * | 1/1990 | Hyde | ................. | B29C 49/4802 220/675 |
| 5,791,431 | A * | 8/1998 | Asao | ....................... | B62K 5/01 180/311 |
| 6,910,716 | B2 * | 6/2005 | Kurayoshi | ............... | B62J 35/00 280/835 |
| 7,252,170 | B2 * | 8/2007 | Miyakozawa | ........... | B62J 35/00 180/219 |
| 8,511,656 | B2 * | 8/2013 | Yahata | .................. | F16F 1/3842 248/635 |
| 8,979,131 | B2 * | 3/2015 | Schwark | ................ | B60K 15/07 248/635 |

* cited by examiner

*Primary Examiner* — Kevin Hurley
(74) *Attorney, Agent, or Firm* — Quinn Law Group, PLLC

(57) ABSTRACT

A fuel tank assembly includes a fuel tank and a coupling assembly for coupling the fuel tank to the underbody of a vehicle. The fuel tank includes a tank body and a plurality of tabs extending from the tank body. Each tab has a tab opening. The coupling assembly includes at least one strap partially surrounding the fuel tank. The strap defines a strap opening. The coupling assembly further includes at least one fastener extending through the strap opening and the tab opening. Further, the coupling assembly includes a compression sleeve partially positioned in the tab opening. The compression sleeve defines a sleeve opening for receiving the fastener. The compression sleeve has a height that is greater than the height of each of the tabs in order to attenuate the transfer of tensile loads from the at least one strap to the tabs.

20 Claims, 2 Drawing Sheets

FUEL TANK COUPLING ASSEMBLY

TECHNICAL FIELD

The present disclosure relates to a coupling assembly for coupling a fuel tank to a vehicle body.

BACKGROUND

Some vehicles include a fuel tank for storing fuel, such as gasoline. In cars, the fuel tank is typically coupled to the underbody of the vehicle. To do so, fasteners can be used to couple the fuel tank to the underbody of the vehicle.

SUMMARY

It is useful to maintain the fuel tank in a horizontal position relative to the underbody of the vehicle to enhance the structural integrity of the connection between the fuel tank and the vehicle body. The present disclosure describes a coupling assembly capable of coupling the fuel tank to the underbody of the vehicle while maintaining the fuel tank in a horizontal position relative to the floor pan of the vehicle. The fuel tank includes a tank body and a plurality of tabs extending from the tank body. Each tab has a tab opening. The coupling assembly includes at least one strap partially surrounding the fuel tank. The strap defines a strap opening. The coupling assembly further includes at least one fastener extending through the strap opening and the tab opening. Further, the coupling assembly includes a compression sleeve partially positioned in the tab opening. The compression sleeve defines a sleeve opening for receiving the fastener. The compression sleeve has a height that is greater than the height of each of the tabs in order to minimize transfer of tensile loads from the strap to the tabs. The arrangement of the coupling assembly allows the fuel tank to float vertically along the compression sleeves. The present disclosure also describes a vehicle including the coupling assembly described above.

The above features and advantages and other features and advantages of the present teachings are readily apparent from the following detailed description of the best modes for carrying out the teachings when taken in connection with the accompanying drawings.

DETAILED DESCRIPTION

Figure 1:
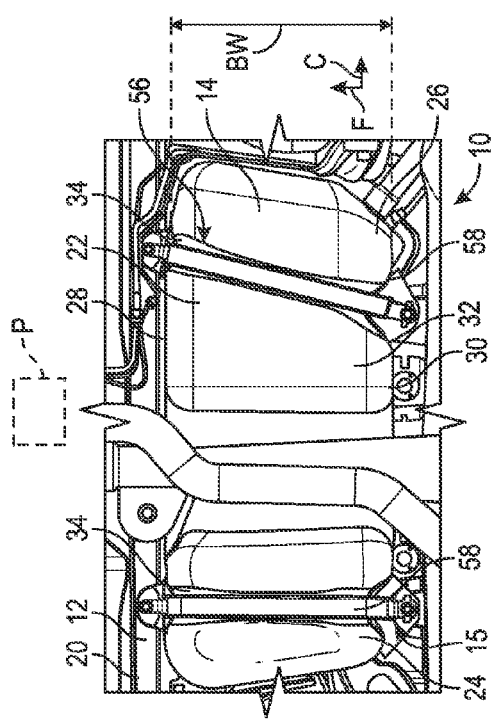
FIG. 1 is a schematic bottom, fragmentary view of a vehicle, wherein the vehicle includes a vehicle body, a fuel tank, and a coupling assembly for coupling the fuel tank to the vehicle body.

Referring to the drawings, wherein like reference numbers correspond to like or similar components throughout the several figures, and beginning with FIG. 1, a vehicle 10 includes a vehicle body 12 and a fuel tank 14 coupled to the vehicle body 12. An internal combustion engine is in fluid communication with the fuel tank 14. Consequently, fuel can flow from the fuel tank 14 to the internal combustion engine. During operation, the internal combustion engine combusts an air/fuel mixture in order to propel the vehicle 10.

The vehicle 10 may be a land vehicle, such as a car, or any other suitable vehicle, such as a boat. In the depicted embodiment, the vehicle 10 is a car and includes a plurality of wheels 16 coupled to the vehicle body 12. The vehicle body 12 includes an underbody 18 configured to face the road. The underbody 18 of the vehicle body 12 may be formed by a floor pan 20, which is made of a substantially rigid material, such as a metal or metal alloy. The floor pan 20 may be substantially flat.

Figure 2:
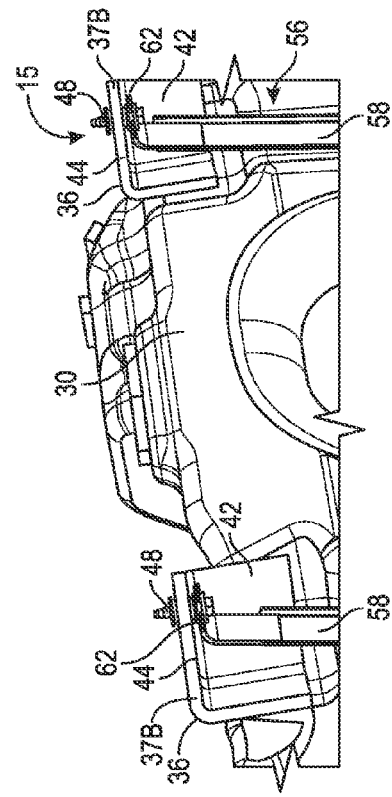
FIG. 2 is a schematic enlarged bottom, fragmentary view of the fuel tank, the vehicle body, and the coupling assembly, depicting the straps of the coupling assembly coupling the fuel tank to the vehicle body.
Figure 3:
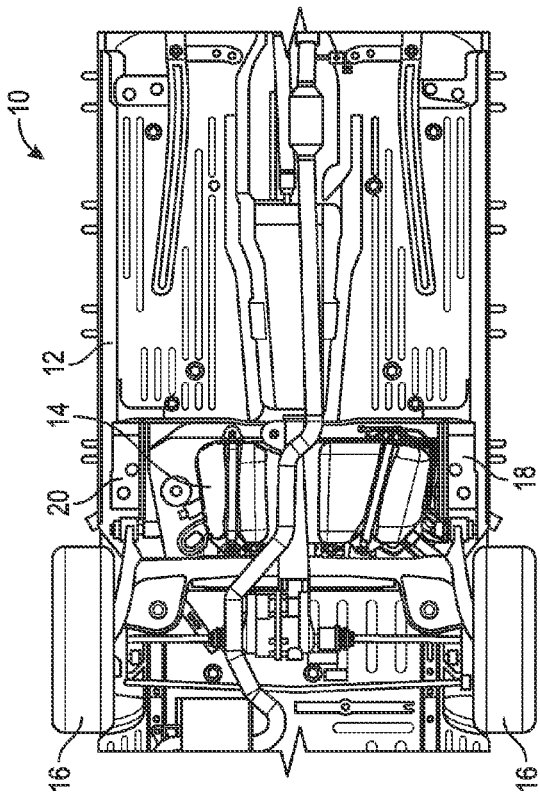
FIG. 3 is a schematic perspective, fragmentary view of a front side of the fuel tank and the coupling assembly, wherein the straps of the coupling assembly are coupled to the front tabs of the fuel tank by fasteners.
Figure 4:
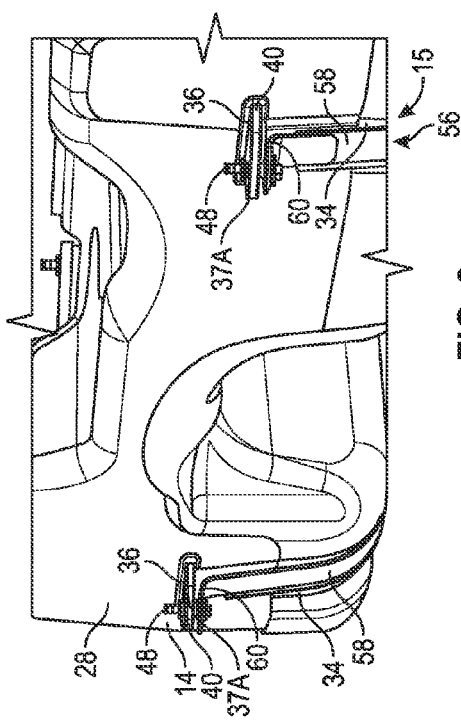
FIG. 4 is a schematic perspective, fragmentary view of a rear side of the fuel tank and the coupling assembly, wherein the straps of the coupling assembly are coupled to the rear tabs of the fuel tank by fasteners.

With reference to FIGS. 2, 3, and 4, the fuel tank 14 is coupled to the underbody 18 of the vehicle body 12 and can store fuel, such as gasoline. Specifically, the fuel tank 14 is coupled to the floor pan 20 and includes a substantially hollow tank body or shell 22 capable of holding fuel. In the depicted embodiment, the fuel tank 14 (including the tank body 22) is wholly or partly made of a substantially rigid polymeric material, such as polyethylene. The tank body 22 is elongated along the cross-car direction C of the vehicle body 12 and includes a first body sidewall 24 and a second body sidewall 26 opposite the first body sidewall 24. The first body sidewall 24 is spaced from the second body sidewall 26 along the cross-car direction C. The tank body 22 further includes a front body wall 28 and a rear body wall 30 opposite the front body wall 28. The front body wall 28 is spaced from the rear body wall 30 along a fore-aft direction F of the vehicle body 12. The tank body 22 includes a bottom body wall 32 interconnecting the front body wall 28, the rear body wall 30, the first body sidewall 24, and the second body sidewall 26.

The fuel tank 14 further includes a plurality of grooves 34 extending along the bottom body wall 32, the front body wall 28, and the rear body wall 30. Although the drawings show two grooves 34, it is contemplated that the fuel tank 14 may have more or fewer grooves 34. Each groove 34 extends along the entire width BW of the bottom body wall 32, but only along a portion of the front body wall 28 and the rear body wall 30.

The fuel tank 14 further includes a plurality of tabs 36 at the end of (or at least near the end of) the grooves 34. Each tab 36 extends from the tank body 22 in the fore-aft direction F. In particular, the tabs 36 include front (or first) tabs 37A and rear (or second) tabs 37B. The front tabs 37A extend from the front body wall 28, and the rear tabs 37B extend from the rear body wall 30. In the depicted embodiment, the front tabs 37A are molded with the tank body 22, whereas the rear tabs 37B are welded to the tank body 22. Each front tab 37A includes a substantially planar front tab body 40 extending directly from the front body wall 28 away from the rear body wall 30. The substantially planar front tab body 40 is parallel to a horizontal plane P in order to help maintain the fuel tank 14 in a substantially horizontal position relative to the vehicle body 12. The rear tabs 37B include a connection portion 42 and a substantially planar rear tab body 44 coupled to the connection portion 42. The connection portion 42 is directly coupled (e.g., welded) to the fuel tank body 22 and extends from the fuel tank body 22 away from the bottom body wall 32. The rear tab body 44 extends perpendicularly from the connection portion 42 and is parallel to the horizontal plane P.

Although the drawings show two front tabs 37A and two rear tabs 37B, the fuel tank 14 may include more or fewer tabs 36. Regardless of the specific quantity, at least a portion of each tab 36 has a substantially planar shape in order to allow the fuel tank 14 to be positioned horizontally along a horizontal plane P (FIG. 2). It is useful to maintain the fuel tank 14 in a horizontal position against the flat floor pan 20 in order to enhance the connection between the fuel tank 14 and the vehicle body 12. Thus, the tabs 36 are parallel to the horizontal plane P, and the horizontal plane P extends along the cross-car direction C and the fore-aft direction F of the vehicle body 12. The fore-aft direction F is perpendicular to the cross-car direction C of the vehicle body 12.

Figure 5:
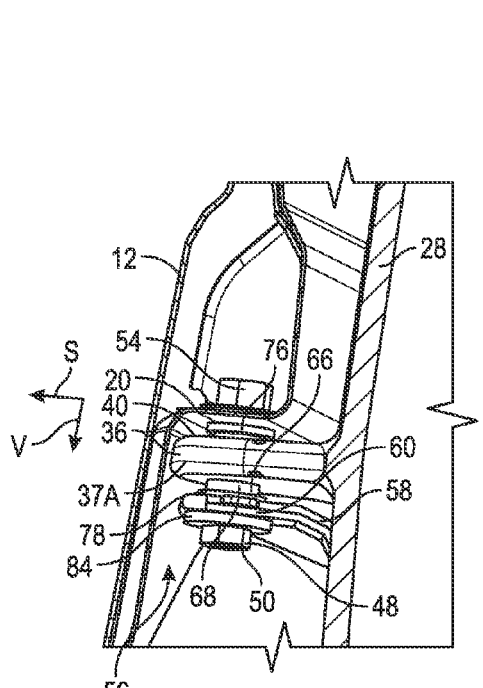
FIG. 5 is a partially schematic cross-sectional, fragmentary perspective view of the fuel tank, the vehicle body, and the coupling assembly, depicting the fastener extending through one of the front tabs, one of the straps, and the vehicle body.
Figure 6:
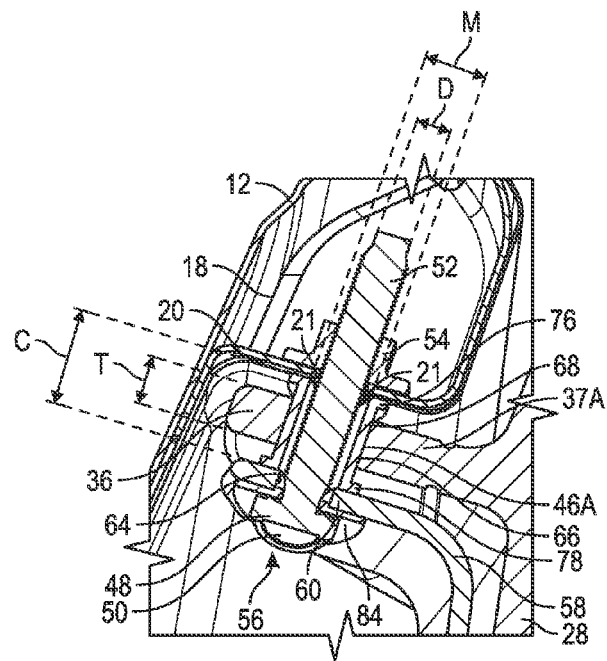
FIG. 6 is a schematic, cross-sectional, fragmentary view of the fuel tank, the vehicle body, and the coupling assembly, depicting the fastener extending through one of the front tabs, one of the straps, the vehicle body, and a compression sleeve partially disposed within the front tab.
Figure 7:
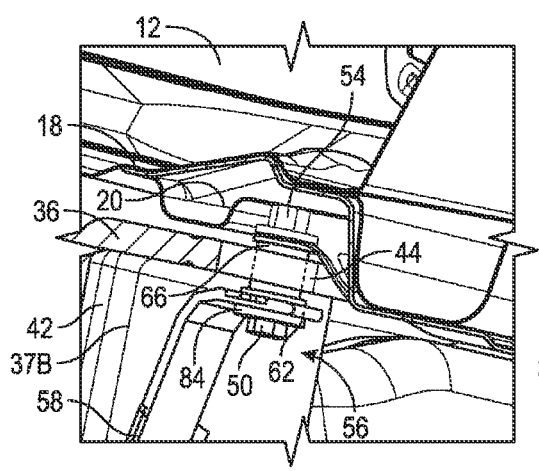
FIG. 7 is a partially schematic cross-sectional, fragmentary view of the fuel tank, the vehicle body, and the coupling assembly, depicting the fastener extending through one of the rear tabs, one of the straps, the compression sleeve, and the vehicle body.
Figure 8:
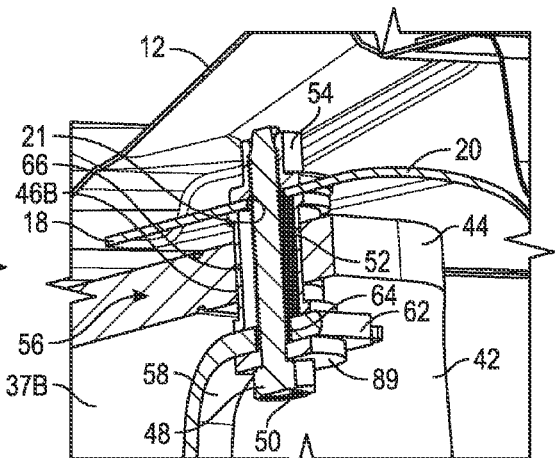
FIG. 8 is a schematic, cross-sectional, fragmentary perspective view of the fuel tank, the vehicle body, and the coupling assembly, depicting the fastener extending through one of the rear tabs, one of the straps, the vehicle body, and a compression sleeve partially disposed within the rear tab.

With reference to FIGS. 5 and 6, each front tab 37A has a tab opening 46A, such as a thru-hole, extending through the front tab body 40. The tab opening 46A is configured, shaped, and sized to receive a fastener 48, such as a bolt. In the depicted embodiment, the fastener 48 includes a head 50, such as a hexagonal head, and a threaded shaft 52 coupled to the head 50. The threaded shaft 52 is configured, sized, and shaped to be disposed in the tab opening 46A. A nut 54, such as a weld nut, can mate with the threaded shaft 52 and can therefore be used to secure the fastener 48 to the front tab 37A With reference to FIGS. 7 and 8, each rear tab 37B also has a tab opening 46B, such as a thru-hole, extending through the rear tab body 44. The tab opening 46B is configured, shaped, and sized to receive a fastener 48, such as a bolt. As discussed above, the fastener 48 includes a head 50 and a threaded shaft 52 coupled to the head 50. The threaded shaft 52 is configured, shaped, and sized to be disposed in the tab opening 46B. A nut 54, such as a weld nut, can mate with the threaded shaft 52 and can therefore be used to secure the fastener 49 to the rear tab 37B.

Referring again to FIGS. 2, 3, and 4, the vehicle 10 includes a coupling assembly 56 for coupling the fuel tank 14 to the vehicle body 12. The coupling assembly 56 and the fuel tank 14 may collectively be referred to as the fuel tank assembly 15. The fuel tank assembly 15 can be coupled to the vehicle body 12. In the depicted embodiment, the coupling assembly 56 includes a plurality of straps 58 for securing the fuel tank 14 to the underbody 18 of the vehicle body 12. Although flexible, the straps 58 are made of a substantially hard material, such as a hard metal. For example, the straps 58 may be wholly or partially made of steel. Irrespective of the specific material employed, each strap 58 is wholly or partly made of a material that has a higher hardness than the hardness of the material forming the fuel tank 14 (including the tabs 36) so that the straps 58 can support the fuel tank 14. While the depicted embodiment shows two straps 58, the coupling assembly 56 may include more or fewer straps 58. Regardless of the quantity, each strap 58 is configured, shaped, and sized to be received in the grooves 34. Each strap 58 extends along the entire width BW (FIG. 2) of the bottom body wall 32 in order to securely couple the fuel tank 14 to the vehicle body 12. For this reason, each groove 34 extends along the entire width BW (FIG. 2) of the bottom body wall 32. Each strap 58 includes a first end portion 60 and a second end portion 62 opposite the first end portion 60. The first end portion 60 and the second end portion 62 of the straps 58 serve as anchor points and can be attached to the tabs 36 using fasteners 48. As discussed in detail below, the first end portions 60 of the straps 58 are coupled to the front tabs 37A, and the second end portions 62 of the straps 58 are coupled to the rear tabs 37B.

With reference to FIGS. 5-8, each strap 58 has strap openings 64, such as thru-holes, extending through the first end portion 60 and the second end portion 62. Each strap opening 64 is configured, shaped, and sized to receive a fastener 48. Specifically, the threaded shaft 52 of the fastener 48 can extend through one of the strap openings 64. The fastener 48 can be inserted through the strap opening 64, the tab opening 46A (or 46B) and the floor pan 20 in order to couple the straps 58 to the underbody 18 of the vehicle body 12. The floor pan 20 has pan openings 21, such as thru-holes, each configured, shaped, and sized to receive the fastener 48. The nut 54 can be threadedly engaged with the threaded shaft 52 in order to secure the fastener 48 to the floor pan 20. Accordingly, when the nut 54 is tightened to the threaded shaft 52, the nut 54 contacts the floor pan 20.

The coupling assembly 56 further includes a compression sleeve 66 in each tab opening 46A (and 46B) for managing the vertical tensile loads V (FIG. 5) from straps 58 as well as the horizontal plane shear loads S (FIG. 5). In particular, the compression sleeves 66 allow the tabs 36 to be vertically spaced apart from the vehicle body 12 so as to minimize the vertical stress on the tabs 36. By minimizing the vertical stress on the tabs 36, the fatigue life of the tabs 36 is maximized.

Figure 9:
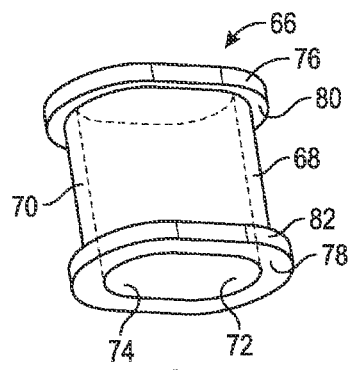
FIG. 9 is a schematic perspective view of a compression sleeve.

With reference to FIG. 9, each compression sleeve 66 includes a substantially hollow sleeve body 68 having an outer sleeve surface 70 and an inner sleeve surface 72 opposite the outer sleeve surface 72. The inner sleeve surface 72 defines a sleeve opening 74 (e.g., a thru-hole) configured, shaped, and sized to receive the threaded shaft 52 of the fastener 48 (FIG. 6). The sleeve body 68 may have an oblong shape or any other circumferential shape suitable to fit in the tab opening 46A (and 46B). For instance, the sleeve body 68 may be shaped as an elliptic cylinder, a parabolic cylinder, a right circular cylinder, a hyperbolic cylinder, or any other suitable cylinder. The sleeve opening 74 has a maximum diameter M (FIG. 6) that is greater than the external diameter D of the threaded shaft 52 in order to minimize load transfers between the fastener 48 and the compression sleeve 66 when the fastener 48 is coupling the tab 36, the strap 58, and the floor pan 20 (FIG. 6). The arrangement of the coupling assembly 56 allows the fuel tank 14 to float vertically along the compression sleeves 66.

The compression sleeve 66 additionally includes a first rim 76 and a second rim 78 extending outwardly (i.e., away from the sleeve opening 74) from the sleeve body 68. The first rim 76 extends from a first sleeve end 80 of the sleeve body 68, and the second rim 78 extends from a second sleeve end 82 of the sleeve body 68. The second sleeve end 82 is opposite the first sleeve end 80 of the sleeve body 68.

The compression sleeve 66 is made of a substantially rigid material (e.g., rigid metal) capable of withstanding the vertical tensile loads V (FIG. 5) from straps 58 as well as the horizontal plane shear loads S (FIG. 5) experienced by the coupling assembly 56 (FIG. 6). Moreover, the substantially rigid material forming the compression sleeve 66 is able to withstand the compressive loads exerted by the nut 54 and the fastener 48 when the straps 58 are locating the fuel tank 14 relative to the vehicle body 12.

With reference to FIGS. 5-8, the sleeve body 68 of the compression sleeve 66 is configured, shaped, and sized to fit in the tab opening 46A (or 46B). The height C of the compression sleeve 66 is greater than the height T of the tab 36 to allow the compression sleeve 66 to separate the tab 36 from the floor pan 20, thereby minimizing the vertical tensile loads V on the tab 36. By minimizing the vertical tensile loads V on the tabs 36, the coupling assembly 56 can maintain the fuel tank 14 substantially horizontal (i.e., parallel to the horizontal plane P (FIG. 2)). Aside from the fasteners 48 and the straps 58 depicted in the drawings, no other fastener or structure is needed to maintain a rigid connection between the fuel tank 14 and the vehicle body 12. Furthermore, because the coupling assembly 56 can sturdily couple the fuel tank 14 to the vehicle body 12, no foam pads are needed between the vehicle body 12 and the first body sidewall 24, the second body sidewall 26, the front body wall 28, the rear body wall 30 of the fuel tank 14 to minimize vibrations along the horizontal plane. In other words, the fuel tank 14 does not need to include foam pads or raised surfaces on the first body sidewall 24, the second body sidewall 26, the front body wall 28, and the rear body wall 30. However, foam pads or raised surface can be included on the top of the tank body or shell 22 to minimize bending in the tabs 36 when the straps 58 compressed the tank body 22 against the vehicle body 12.

To couple the fuel tank 14 to the vehicle body 12 using the coupling assembly 56, one sleeve body 68 is positioned in each tab opening 46A (and 46B). Then, the threaded shaft 52 of one fastener 48 is inserted through the strap opening 64 (of each strap 58), the sleeve opening 74, and the pan openings 21. A washer 89 can be positioned between the head 50 of the fastener 48 and the strap 58 to help distribute the loads along the strap 58. The head 50 is disposed outside the sleeve opening 74, and the threaded shaft 52 is partly disposed inside the sleeve opening 74. Then, one nut 54 is coupled and tightened to each threaded shaft 52 to secure the fastener 48 to the underbody 18 of the vehicle body 12. At this juncture, the first rim 76 of the compression sleeve 66 is in contact with (and pressed against) the floor pan 20, and the second rim 78 is in contact with (and pressed against) the strap 58.

While the best modes for carrying out the teachings have been described in detail, those familiar with the art to which this disclosure relates will recognize various alternative designs and embodiments for practicing the teachings within the scope of the appended claims.

The invention claimed is:

1. A vehicle, comprising:
a vehicle body including a floor pan, wherein the floor pan includes at least one pan opening;
a fuel tank coupled to the floor pan, wherein the fuel tank includes a tank body and a plurality of tabs extending from the tank body, wherein each of the tabs defines a tab opening and has a height;
a coupling assembly coupling the fuel tank to the floor pan, wherein the coupling assembly includes:
at least one strap partially surrounding the fuel tank, wherein the at least one strap defines a strap opening;
at least one fastener extending through the strap opening, and the tab opening in order to couple the strap to the fuel tank;
a compression sleeve partially positioned in the tab opening, wherein the compression sleeve defines a sleeve opening, and the at least one fastener extends through the sleeve opening and the at least one pan opening in order to couple the fuel tank to the floor pan; and
wherein the compression sleeve has a height that is greater than the height of each of the tabs in order to attenuate transfer of tensile loads from the at least one strap to the tabs.

2. The vehicle of claim 1, wherein the compression sleeve includes a sleeve body, a first rim coupled to the sleeve body, and a second rim coupled to the sleeve body, the first rim contacts the floor pan, and the second rim contacts the at least one strap.

3. The vehicle of claim 2, wherein the sleeve body defines a first sleeve end and a second sleeve end opposite the first sleeve end, the first rim extends from the first sleeve end, and the second rim extends from the second sleeve end.

4. The vehicle of claim 3, wherein the at least one fastener includes a head and a threaded shaft coupled to the head, the head is disposed outside the sleeve opening, and the threaded shaft is partly disposed inside the sleeve opening.

5. The vehicle of claim 4, wherein the threaded shaft has an external diameter, the sleeve opening has a maximum diameter, and the maximum diameter is greater than the external diameter.

6. The vehicle of claim 5, wherein the sleeve body has an oblong shape.

7. The vehicle of claim 5, further comprising a nut threadedly engaged with the threaded shaft, wherein the nut is in contact with the floor pan in order to secure the at least one fastener to the floor pan.

8. The vehicle of claim 1, wherein the tank body includes a front body wall, a rear body wall opposite the front body wall, and a bottom body wall interconnecting the front body wall and the rear body wall, the plurality of tabs includes front tabs and rear tabs, the front tabs extend from the front body wall, and the rear tabs extend from the rear body wall.

9. The vehicle of claim 8, wherein the at least one strap includes a first end portion and a second end portion opposite the first end portion, the first end portion is coupled to one of the front tabs, and the second end portion is coupled to one of the rear tabs.

10. The vehicle of claim 9, wherein the fuel tank defines at least one groove extending along an entire width of the bottom body wall, and the at least one strap is at least partially disposed in the at least one groove.

11. The vehicle of claim 1, wherein the fuel tank is positioned horizontally along a horizontal plane, and each of the tabs has a substantially planar shape that is parallel to the horizontal plane.

12. A fuel tank assembly, comprising:
a fuel tank including a tank body and a plurality of tabs extending from the tank body, wherein each of the tabs defines a tab opening and has a height;
at least one strap partially surrounding the fuel tank, wherein the at least one strap defines a strap opening;
at least one fastener extending through the strap opening and the tab opening in order to couple the strap to the fuel tank;
a compression sleeve partially positioned in the tab opening,
wherein the compression sleeve defines a sleeve opening, and the at least one fastener extends through the sleeve opening; and wherein the compression sleeve has a height that is greater than the height of each of the tabs in order to attenuate transfer of tensile loads from the at least one strap to the tabs.

13. The fuel tank assembly of claim 12, wherein the compression sleeve includes a sleeve body, a first rim coupled to the sleeve body, and a second rim coupled to the sleeve body, the first rim is configured to contact a floor pan, and the second rim contacts the at least one strap.

14. The fuel tank assembly of claim 13, wherein the sleeve body defines a first sleeve end and a second sleeve end opposite the first sleeve end, the first rim extends from the first sleeve end, and the second rim extends from the second sleeve end.

15. The fuel tank assembly of claim 14, wherein the at least one fastener includes a head and a threaded shaft coupled to the head, the head is disposed outside the sleeve opening and the threaded shaft is partly disposed inside the sleeve opening.

16. The fuel tank assembly of claim 15, wherein the threaded shaft has an external diameter, the sleeve opening has a maximum diameter, and the maximum diameter is greater than the external diameter.

17. The fuel tank assembly of claim 16, wherein the sleeve body has an oblong shape.

18. The fuel tank assembly of claim 16, further comprising a nut threadedly engaged with the threaded shaft.

19. The fuel tank assembly of claim 12, wherein the tank body includes a front body wall, a rear body wall opposite the front body wall, and a bottom body wall interconnecting the front body wall and the rear body wall, the plurality of tabs includes front tabs and rear tabs, the front tabs extend from the front body wall, and the rear tabs extend from the rear body wall.

20. The fuel tank assembly of claim 12, wherein the fuel tank is positioned horizontally along a horizontal plane, and the each of the tabs have a substantially planar shape that is parallel to the horizontal plane.

* * * * *